United States Patent
Li et al.

(10) Patent No.: US 8,736,787 B2
(45) Date of Patent: May 27, 2014

(54) LIQUID CRYSTAL PANEL MODULE, BACKLIGHT MODULE AND LIQUID CRYSTAL DISPLAY

(75) Inventors: Wang-Yang Li, Miao-Li County (TW); Hung-Yu Lin, Miao-Li County (TW); Hsin-Wen Chang, Miao-Li County (TW); Yi-Pan Liang, Tainan County (TW); Chien-Chih Wang, Tainan County (TW); Wai-Hon Lee, Hsinchu (TW); Hua-Fang Tsai, Hsinchu (TW)

(73) Assignees: Chimei Innolux Corporation, Miao-Li County (TW); Chi Mei Corporation, Tainan (TW); Klaser Technology, Inc., Hsinchu (TW)

( * ) Notice: Subject to any disclaimer, the term of this patent is extended or adjusted under 35 U.S.C. 154(b) by 519 days.

(21) Appl. No.: 12/985,534

(22) Filed: Jan. 6, 2011

(65) Prior Publication Data

US 2011/0187964 A1 Aug. 4, 2011

(30) Foreign Application Priority Data

Feb. 4, 2010 (TW) ............................... 99103358 A

(51) Int. Cl.
*G02F 1/13357* (2006.01)
(52) U.S. Cl.
USPC .............................................. 349/65; 349/62
(58) Field of Classification Search
None
See application file for complete search history.

(56) References Cited

U.S. PATENT DOCUMENTS

| | | | | |
|---|---|---|---|---|
| 5,046,827 A * | 9/1991 | Frost et al. | ..................... | 349/112 |
| 6,011,602 A * | 1/2000 | Miyashita et al. | .............. | 349/65 |
| 6,086,212 A * | 7/2000 | Onishi et al. | ................... | 362/621 |
| 6,151,166 A * | 11/2000 | Matsushita et al. | ........... | 359/566 |
| 6,351,334 B1 * | 2/2002 | Hsieh et al. | ..................... | 359/571 |
| 6,639,642 B1 * | 10/2003 | Suzuki et al. | .................. | 349/146 |
| 2003/0095400 A1 * | 5/2003 | Kashima et al. | ................ | 362/31 |
| 2004/0105046 A1 * | 6/2004 | Taira et al. | ....................... | 349/61 |
| 2004/0130880 A1 * | 7/2004 | Min et al. | ......................... | 362/31 |
| 2004/0141108 A1 * | 7/2004 | Tanaka et al. | ................... | 349/96 |
| 2005/0078374 A1 * | 4/2005 | Taira et al. | ..................... | 359/569 |

(Continued)

FOREIGN PATENT DOCUMENTS

JP 2002-182201 A * 6/2002
JP 2006-331658 A * 12/2006

(Continued)

OTHER PUBLICATIONS

Office Action dated Aug. 12, 2013 from corresponding application No. TW 099103358.

*Primary Examiner* — Mike Stahl
(74) *Attorney, Agent, or Firm* — Lowe Hauptman & Ham, LLP

(57) ABSTRACT

A liquid crystal panel module, a backlight module and a liquid crystal display (LCD) are provided. The liquid crystal panel module includes a liquid crystal panel and a diffraction grating layer. The liquid crystal panel has a plurality of pixels. The diffraction grating layer is disposed on the liquid crystal panel, and a maximum period of a grating of the diffraction grating layer is smaller than $\frac{1}{10}$ of a size of the pixels. The backlight module includes a light guide plate, a light emitting element and a diffraction grating film. A light provided by the light emitting element emits from a light emitting surface of the light guide plate and is bended towards the light emitting element after passing through the diffraction grating film. The liquid crystal panel module and the backlight module can be applied to the LCD together or individually.

4 Claims, 14 Drawing Sheets

(56) References Cited

U.S. PATENT DOCUMENTS

2005/0135746 A1* 6/2005 Yu et al. ............................ 385/37
2007/0064294 A1* 3/2007 Hoshino et al. ............... 359/237
2008/0158479 A1* 7/2008 Qi ................................... 349/66
2011/0216266 A1* 9/2011 Travis .............................. 349/62

FOREIGN PATENT DOCUMENTS

| JP | 2011-154078 A | * | 8/2011 |
|----|---------------|---|--------|
| TW | I313379 | | 8/2009 |
| TW | 200951560 | | 12/2009 |
| TW | 201000963 | | 1/2010 |

* cited by examiner

LIQUID CRYSTAL PANEL MODULE, BACKLIGHT MODULE AND LIQUID CRYSTAL DISPLAY

CROSS-REFERENCE TO RELATED APPLICATION

This application claims the priority benefit of Taiwan application serial no. 99103358, filed on Feb. 4, 2010. The entirety of the above-mentioned patent application is hereby incorporated by reference herein and made a part of specification.

BACKGROUND

1. Field of the Invention

The invention relates to a panel module, a light source module and a display device. Particularly, the invention relates to a liquid crystal panel module, a backlight module, and a liquid crystal display.

2. Description of Related Art

Presently, performance requirements for liquid crystal displays (LCDs) in the market are high contrast, no gray level inversion, small color shift, high brightness, high color richness, high color saturation, fast response speed, and wide viewing angle, etc. A liquid crystal material is a high efficiency refractive index modulation material. An optical path difference of a normal light and an oblique light penetrating through a liquid crystal layer in the LCD may reach a half wavelength, so that the LCD has problems of color shift, brightness reduction and gray level inversion, etc. in case of a large viewing angle. Techniques that can achieve the wide viewing angle requirement includes twisted nematic (TN) liquid crystal plus a wide viewing film, and a multi-domain vertical alignment (MVA) LCD, etc. However, the wide viewing film used by the TN LCD is expensive, and the MVA LCD has problems of complicated fabrication process, long fabrication time, high cost, low aperture ratio and low process yield.

Moreover, since light emitting directions of backlight modules used by the LCD are inconsistent, light utilization efficiency thereof is low. Especially, a great part of the light provided by the backlight module with a side light-incident design cannot orthogonally enter the liquid crystal panel.

Moreover, due to portability of electronic devices, consumers may frequently use the LCDs of the electronic devices in public places. When a consumer read a private letter or data through the LCD in the public place, the private data can be peeped by others and is probably leaked out.

SUMMARY OF THE INVENTION

The invention is directed to a liquid crystal panel module, which can resolve problems of color shift, brightness reduction and gray level inversion.

The invention is directed to a backlight module, which can resolve a problem of low light utilization efficiency.

The invention is directed to a liquid crystal display (LCD), which can resolve problems of color shift, brightness reduction and gray level inversion of a liquid crystal panel module, or resolve a problem of low light utilization efficiency of a backlight module.

The invention provides a liquid crystal panel module including a liquid crystal panel and a diffraction grating layer. The liquid crystal panel has a plurality of pixels. The diffraction grating layer is disposed on the liquid crystal panel, and a maximum period of a grating of the diffraction grating layer is substantially smaller than $1/10$ of a size of the pixels.

In an embodiment of the liquid crystal panel module of the invention, the grating of the diffraction grating layer is a phase grating, for example, a sinusoidal phase grating. Moreover, a peak to trough phase delay of the phase grating is, for example, less than or equal to 2.9. Moreover, the peak to trough phase delay of the phase grating is, for example, greater than or equal to 2. Alternatively, the peak to trough phase delay of the phase grating is, for example, greater than or equal to 0.9. A diffraction angle of the phase grating is, for example, between 20 degree and 65 degree. Moreover, a period of the phase grating is, for example, between 205 nm and 1900 nm. Moreover, a peak to trough thickness difference of the phase grating is, for example, less than 1800 nm. Moreover, the peak to trough thickness difference of the phase grating is, for example, between 108.9 nm and 223.5 nm. In an embodiment of the invention, the grating of the diffraction grating layer is a blazed grating. Moreover, a peak to trough thickness difference of the blazed grating is, for example, less than 1950 nm. Moreover, the peak to trough thickness difference of the blazed grating is, for example, between 70 nm and 713 nm. Moreover, a diffraction angle of the blazed grating is, for example, between 20 degree and 65 degree. Moreover, a period of the blazed grating is, for example, between 209 nm and 1900 nm. Moreover, the blazed grating is, for example, a binary approximation blazed grating.

In an embodiment of the liquid crystal panel module of the invention, the liquid crystal panel module further includes a first polarizer and a second polarizer. The liquid crystal panel is disposed between the first polarizer and the second polarizer. The first polarizer includes a first protection film, a polarization layer and the diffraction grating layer. The polarization layer is disposed between the first protection film and the diffraction grating layer. Moreover, the first polarizer further includes an anti-glare treatment layer, and the diffraction grating layer is disposed between the polarization layer and the anti-glare treatment layer. Moreover, the first polarizer further includes a second protection film, and the anti-glare treatment layer is disposed between the second protection layer and the diffraction grating layer. Moreover, an air layer or a medium with a refractive index different to a refractive index of the diffraction grating layer is formed between the second protection layer and the anti-glare treatment layer. Moreover, the first polarizer further includes a second protection film, and the diffraction grating layer is disposed between the polarization layer and the second protection film. Moreover, an air layer or a medium with a refractive index different to a refractive index of the diffraction grating layer is formed between the second protection film and the diffraction grating layer. Moreover, the first polarizer further includes an anti-reflection layer disposed between the diffraction grating layer and the polarization layer.

In an embodiment of the liquid crystal panel module of the invention, the period of the grating of the diffraction grating layer is a non-constant value.

In an embodiment of the liquid crystal panel module of the invention, the grating of the diffraction grating layer has a plurality of arranging directions.

In an embodiment of the liquid crystal panel module of the invention, a distance between the diffraction grating layer and the liquid crystal panel is between 0.5 mm and 100 mm.

The invention provides a liquid crystal display (LCD) including a backlight module and the aforementioned liquid crystal panel module. The liquid crystal panel module is disposed on the backlight module.

In an embodiment of the LCD of the invention, the liquid crystal panel is located between the diffraction grating layer and the backlight module.

In an embodiment of the LCD of the invention, the diffraction grating layer is located between the liquid crystal panel and the backlight module.

The invention provides a backlight module including a light guide plate, a light emitting element and a diffraction grating film. The light guide plate has a light emitting surface and at least a light incident surface adjacent to the light emitting surface. The light emitting element is disposed next to the light incident surface. The diffraction grating film is disposed on the light emitting surface. A light provided by the light emitting element emits from the light emitting surface and is bended towards the light emitting element after passing through the diffraction grating film.

In an embodiment of the backlight module of the invention, a period of a grating of the diffraction grating film is between 380 nm and 2281 nm. Moreover, a peak to trough thickness difference of the grating of the diffraction grating film is, for example, between 280 nm and 4910 nm.

The invention provides another backlight module including a light guide plate, a light emitting element and a diffraction grating film. The light guide plate has at least one light incident surface. The light emitting element is disposed next to the light incident surface. The diffraction grating film is disposed between the light emitting element and the light incident surface.

In an embodiment of the backlight module of the invention, the light emitting element includes a circuit board and a plurality of light emitting diodes arranged on the circuit board. Moreover, light emitted from each of the light emitting diodes is bended towards a direction apart from each of the light emitting diodes after passing through the diffraction grating film.

The invention provides another backlight module including a light guide plate, a light emitting element and a reflective diffraction grating film. The light guide plate has at least a light incident surface, a light emitting surface and a bottom surface, wherein the light emitting surface is opposite to the bottom surface. The light emitting element is disposed next to the light incident surface. The reflective diffraction grating film is disposed next to the bottom surface. After a part of light provided by the light emitting element sequentially passes through the light incident surface and the bottom surface, it is reflected by the reflective diffraction grating film and again passes through the bottom surface to emit from the light emitting surface.

In an embodiment of the backlight module of the invention, a reflective material layer is disposed on a surface of the reflective diffraction grating film back to the light guide plate.

In an embodiment of the aforementioned three backlight modules of the invention, the grating of the diffraction grating film is a binary approximation blazed grating.

In an embodiment of the aforementioned three backlight modules of the invention, the grating of the diffraction grating film is a blazed grating.

The invention provides another LCD including the aforementioned backlight module and a liquid crystal panel module. The liquid crystal panel module is disposed on the backlight module.

According to the above descriptions, in the liquid crystal panel module of the invention, multi-order diffraction light is used to compensate the problem of color shift under a large viewing angle, and the diffraction grating layer can be used to collimate the large-angle incident light provided by the backlight module. Moreover, the backlight module of the invention can pull straight the obliquely emitted light to improve light utilization efficiency. The LCD of the invention can simultaneously or individually use the aforementioned liquid crystal panel module and the backlight module.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
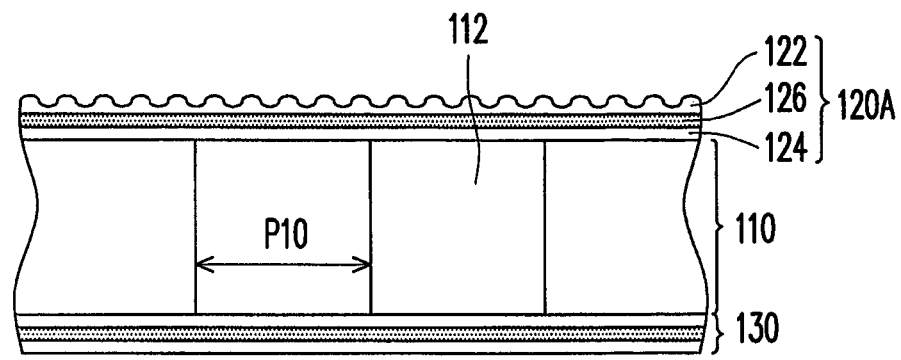
FIG. 1 is a schematic diagram illustrating a liquid crystal panel module according to an embodiment of the invention.
Figure 2A:
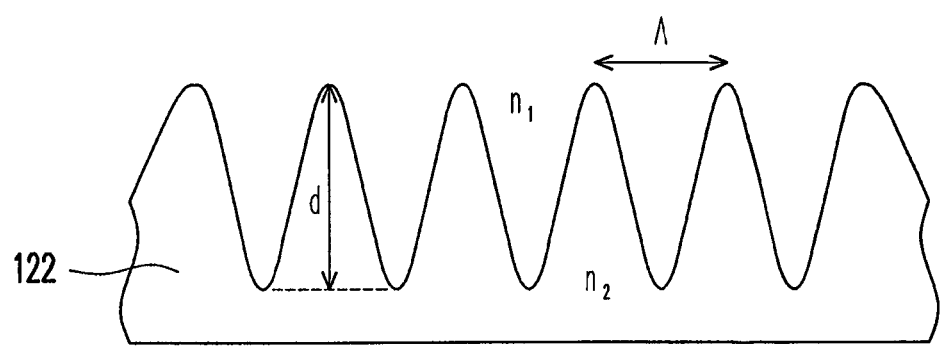
FIG. 2A is a partial enlarged view of a diffraction grating layer of the liquid crystal panel module of FIG. 1.

FIG. 1 is a schematic diagram illustrating a liquid crystal panel module according to an embodiment of the invention, and FIG. 2A is a partial enlarged view of a diffraction grating layer of the liquid crystal panel module of FIG. 1. Referring to FIG. 1 and FIG. 2A, the liquid crystal panel module 100 of the present embodiment includes a liquid crystal panel 110 and a diffraction grating layer 122. The liquid crystal panel 110 has a plurality of pixels 112. The diffraction grating layer 122 is disposed on the liquid crystal panel 110, and a maximum period Λ of a grating of the diffraction grating layer 122 is smaller than ¹⁄₁₀ of a size P10 of the pixels 112.

According to principles of optics, based on undulatory of light, the light can be diffracted by a micro structure, namely, when a normal incident light passes through the diffraction grating layer 122, a part of the light is bended to up and down directions. In other words, the normal light emitted from the liquid crystal panel 110 is bended to up and down viewing angles after passing through the diffraction grating layer 122, so that problems of color shift, gray level inversion and low brightness of the up and down viewing angles can be mitigated. Moreover, by designing the maximum period Λ of the grating of the diffraction grating layer 122 to be less than ¹⁄₁₀ of the size P10 of the pixel 112, moiré caused by the diffraction grating layer 122 the pixels 112 can be avoided. The grating of the diffraction grating layer 122 can be designed to have a single period or multiple periods.

Moreover, the liquid crystal panel module 100 may further include a first polarizer 120A and a second polarizer 130. The liquid crystal panel 110 is disposed between the first polarizer 120A and the second polarizer 130. The first polarizer 120A includes at least a protection film 124, a polarization layer 126 and the diffraction grating layer 122. The polarization layer 126 is disposed between the diffraction grating layer 122 and the protection film 124. When a thickness or a strength of the diffraction grating layer 122 is enough, the diffraction grating layer 122 itself can protect the polarization layer 126. Selectively, a protection film 124, an anti-reflection layer or an anti-glare layer can be further disposed on the diffraction grating layer 122. A material of the protection film 124 is, for example, triacetyl cellulose (TAC). Moreover, a surface of the first polarizer 120A apart from the liquid crystal panel 110 can be processed by an anti-glare treatment, so as to avoid a diffraction pattern generated when an environmental light irradiates the diffraction grating layer 122 influencing a display effect. Moreover, the period of the grating of the diffraction grating layer 122 can be designed as a non-constant value, i.e. the grating may have multiple periods, which may also mitigate a degree that the diffraction pattern influences the display effect. Alternatively, peaks of the grating of the diffraction grating layer 122 are unnecessary to be configured along a same direction, and the peaks of the grating of different blocks can be configured along different directions, which may also mitigate a degree that the diffraction pattern influences the display effect.

Figure 2B:
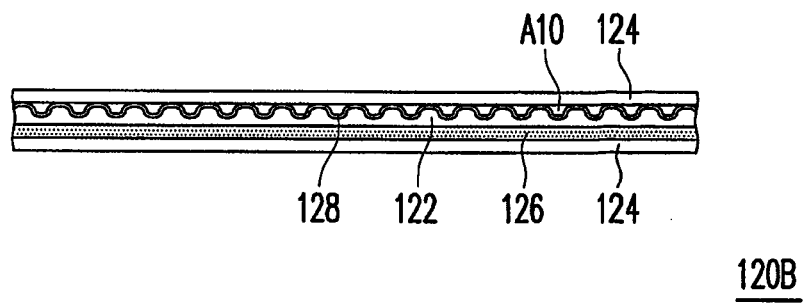
FIG. 2B to FIG. 2D are diagram illustrating three variations of a first polarizer of FIG. 1.
Figure 2C:
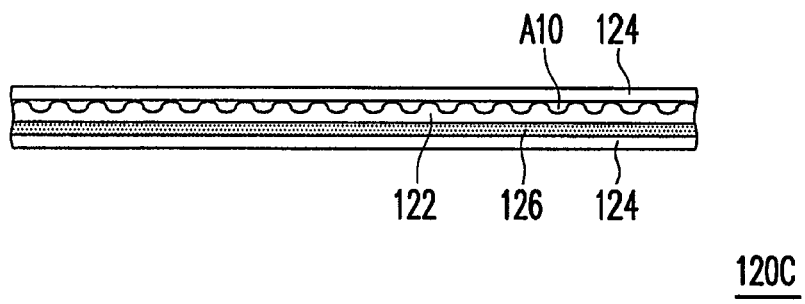
Figure 2D:
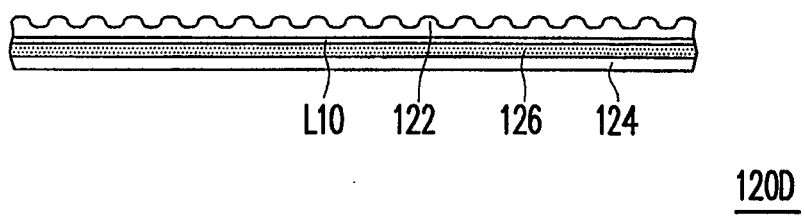

FIG. 2B to FIG. 2D are diagram illustrating three variations of the first polarizer of FIG. 1. Referring to FIG. 2B, the first polarizer 120B of the present embodiment is similar to the first polarizer 120A of FIG. 1, though the first polarizer 120B further includes an anti-glare treatment layer 128 and another protection film 124. The protection film 124 is used for protecting the polarization layer 126. The diffraction grating layer 122 is disposed between the polarization layer 126 and the anti-glare treatment layer 128, and the anti-glare treatment layer 128 is disposed between the upper protection layer 124 and the diffraction grating layer 122. Moreover, an air layer or a medium A10 with a refractive index different to a refractive index of the diffraction grating layer 122 is formed between the upper protection layer 124 and the anti-glare treatment layer 128. The anti-glare treatment layer 128 is, for example, directly formed on the surface of the diffraction grating layer 122, and the upper protection layer 124 is disposed on the anti-glare treatment layer 128. Referring to FIG. 2C, the first polarizer 120C of the present embodiment is similar to the first polarizer 120B of FIG. 2B, though the first polarizer 120C does not include the anti-glare treatment layer 128 of FIG. 2B. Namely, the upper protection layer 124 is directly disposed on the diffraction grating layer 122, and the air layer or the medium A10 with the refractive index different to the refractive index of the diffraction grating layer 122 is also formed there between. Referring to FIG. 2D, the first polarizer 120D of the present embodiment is similar to the first polarizer 120A of FIG. 1, though the first polarizer 120D further includes an anti-reflection layer L10 disposed between the diffraction grating layer 122 and the polarization layer 126. The anti-reflection layer L10 reduces a chance that the light passing through the polarization layer 126 is reflected by the diffraction grating layer 122, so as to improve a light transmittance of the whole first polarizer 120D.

Figure 3:
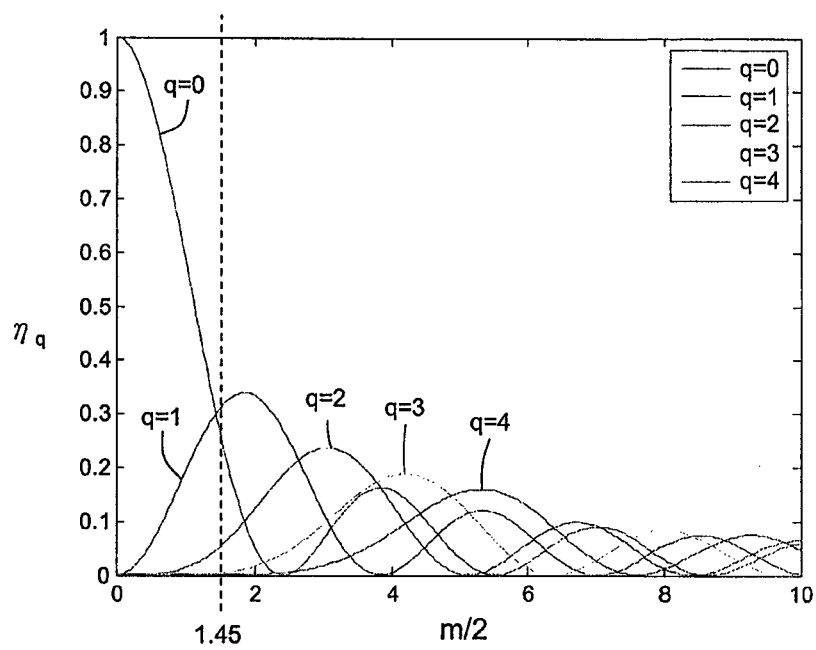
FIG. 3 is a diagram illustrating a relationship between q-th-order diffraction efficiency and a peak to trough phase delay m of a phase grating.

In the present embodiment, the grating of the diffraction grating layer 122 is a phase grating, for example, a sinusoidal phase grating, i.e. a cross section of the diffraction grating layer 122 is approximately a sinusoidal wave, though the cross section of the diffraction grating layer 122 may also have a dentation shape. A q-th-order diffraction efficiency of the phase grating can be represented as:

$$\eta_q = J_q^2(m/2),$$

as shown in FIG. 3.

Where, m is a peak to trough phase delay of the phase grating, $m = 2\pi(n_2 - n_1)d/\lambda$, and J is a Bessel function such as a sine function or a cosine function, etc. In order to maintain a brightness of a center viewing angle and suitably generate splitting light for a large viewing angle, at least a 0th-order diffraction efficiency is required to be greater than or equal to a 1st-order diffraction efficiency. According to FIG. 3, it is known that $m/2 \leq 1.45$ i.e. the peak to trough phase delay of the phase grating is less than or equal to 2.9, which can ensure that the 0th-order diffraction efficiency is greater than or equal to the 1st-order diffraction efficiency. Moreover, the peak to trough phase delay of the phase grating is, for example, greater than or equal to 2, so as to suitably generate splitting light for the large viewing angle.

Figure 5:
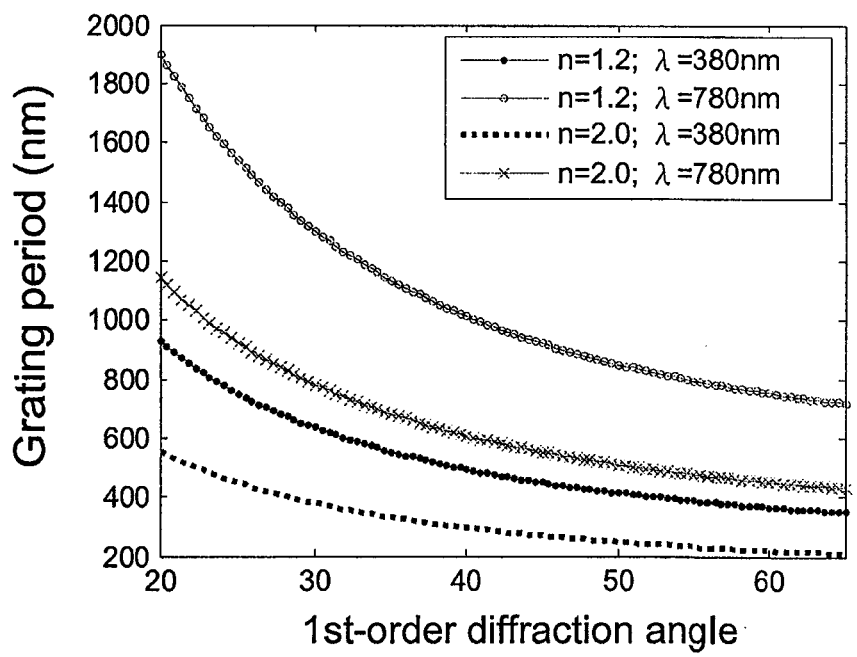
FIG. 5 is a diagram illustrating a relationship between a period and a 1st-order diffraction angle of a phase grating.

Moreover, since the color shift problem is not obvious around the center viewing angle, and a chance that a user views the liquid crystal panel module 100 from a very large viewing angle is relatively low, a diffraction angle of the phase grating is set between 20 degrees and 65 degrees. A 1st-order diffraction angle of the phase grating can be represented by:

$$\phi = \sin^{-1}\left(\frac{\lambda}{n_2 \Lambda}\right),$$

and a relationship between the 1st-order diffraction angle and the period of the phase grating is as that shown in FIG. 5.

Where, λ is a wavelength of an incident light, $n_2$ is the refractive index of the diffraction grating layer 122, and Λ is the period of the phase grating. According to FIG. 5, it is known that when the 1st-order diffraction angle is between 20 degrees and 65 degrees, the period Λ of the phase grating is approximately between 205 nm and 1900 nm, or between 555.5 nm and 1900 nm.

Figure 6:
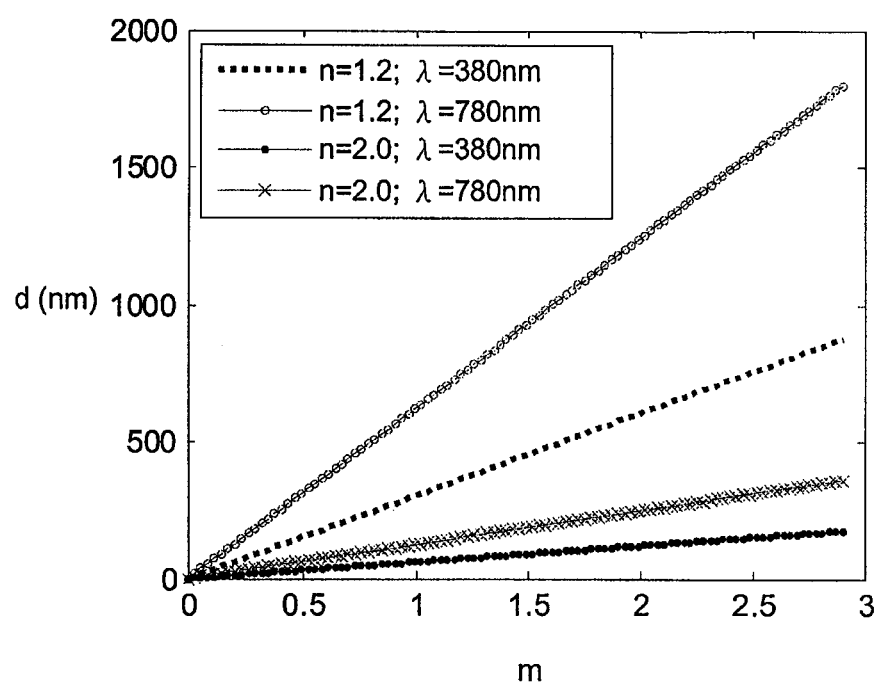
FIG. 6 is a diagram illustrating a relationship between a peak to trough thickness difference and a peak to trough phase delay of a phase grating.

According to the above limitations, the peak to trough phase delay of the phase grating is less than or equal to 2.9, and a peak to trough thickness difference of the phase grating can be represented as:

$$d = \frac{m\lambda}{2\pi(n_2 - n_1)},$$

as shown in FIG. 6.

Figure 4:
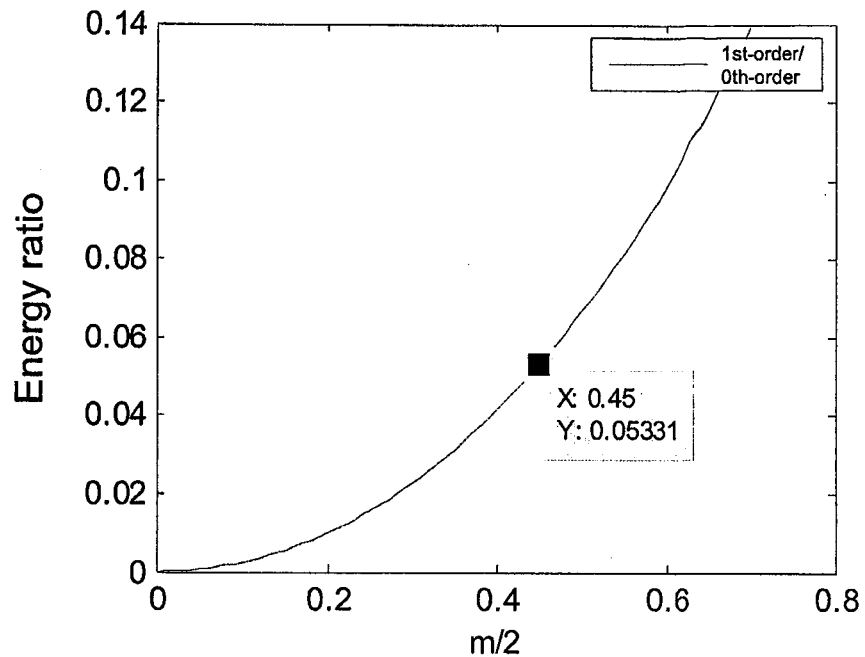
FIG. 4 is a diagram illustrating a relationship between a ratio of 1st-order and 0th-order diffraction energy and a peak to trough phase delay m of a phase grating.

Where, λ is the wavelength of the incident light, $n_1$ is a refractive index of environment of the diffraction grating layer 122 (for example, a refractive index of the air is 1), $n_2$ is the refractive index of the diffraction grating layer 122, and Λ is the period of the phase grating. According to FIG. 6, it is known that the peak to trough thickness difference d of the phase grating is, for example, less than 1800 nm. In an actual application, the backlight source not only has the normal light, but also has oblique light of 5-10 degrees. Since the light incident to the phase grating is not only the normal light, but the oblique light with a relatively small incident angle can also be bended to the large viewing angle, a ratio between the 0th-order diffraction efficiency and the 1st-order diffraction efficiency can be set to about 1:0.05. Referring to FIG. 4, it is known that when m is 0.9, the condition that the ratio between the 0th-order diffraction efficiency and the 1st-order diffraction efficiency is about 1:0.05 is approximately satisfied, i.e. the peak to trough phase delay of the phase grating can be greater than or equal to 0.9. For example, if an angle expected to have the gray level inversion phenomenon is 20 degrees, it represents that the 1st-order diffraction angle of the phase grating is required to be set to 20 degrees, the peaks of grating are configured along a horizontal direction, and the ratio between the 0th-order diffraction efficiency and the 1st-order diffraction efficiency is about 1:0.05, so that the period Λ of the phase grating is between 555.5 nm and 1900 nm, and the peak to trough phase delay m of the phase grating is 0.9. If the refractive index $n_2$ of the diffraction grating layer 122 is 1.5, the peak to trough thickness difference d of the phase grating is between 108.9 nm and 223.5 nm.

Figure 7:
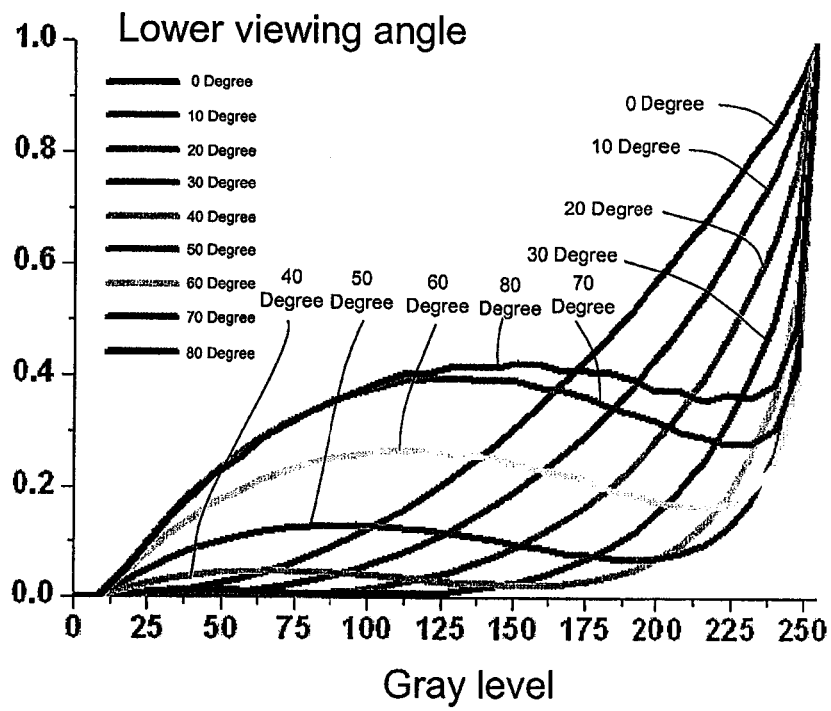
FIG. 7 and FIG. 8 are diagrams illustrating relationships of brightness and gray level before and after a liquid crystal panel module applies a diffraction grating layer.
Figure 8:
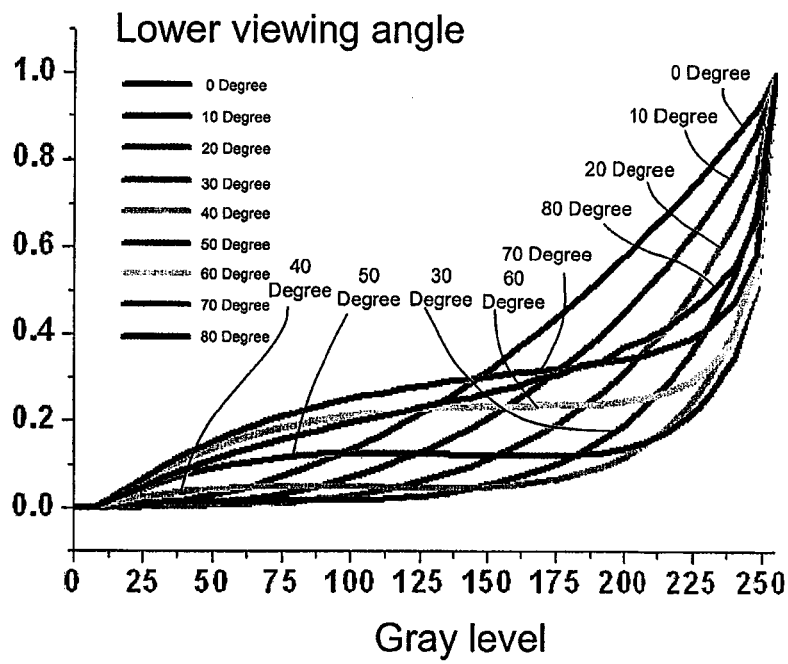

FIG. 7 and FIG. 8 are diagrams illustrating relationships of brightness and gray level before and after the liquid crystal panel module applies the diffraction grating layer. Referring to FIG. 7, if the liquid crystal panel module does not have the diffraction grating layer, a lower viewing angle may have an obvious gray level inversion phenomenon at about 40 degrees. However, according to FIG. 8, it is known that if the liquid crystal panel module has the diffraction grating layer, there is almost none gray level inversion phenomenon. The period of the grating of the diffraction grating layer of FIG. 7 and FIG. 8 is about 1000 nm, and a thickness difference between a thickness at the peak of the grating of the diffraction grating layer and a thickness at the trough of the grating of the diffraction grating layer is about 200-1000 nm.

Figure 9:
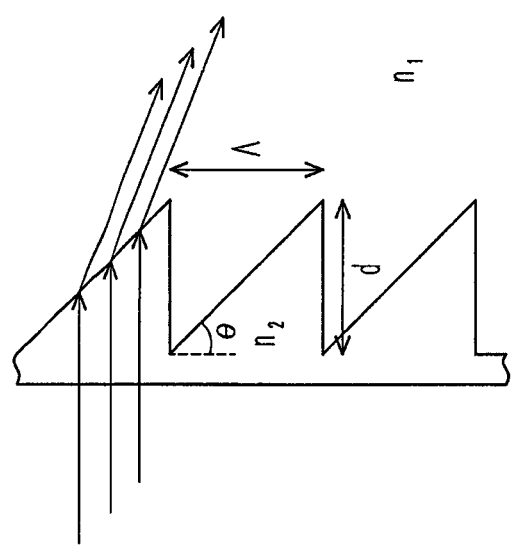
FIG. 9 is a partial enlarged view of a diffraction grating layer of a liquid crystal panel module according to another embodiment of the invention.
Figure 10:
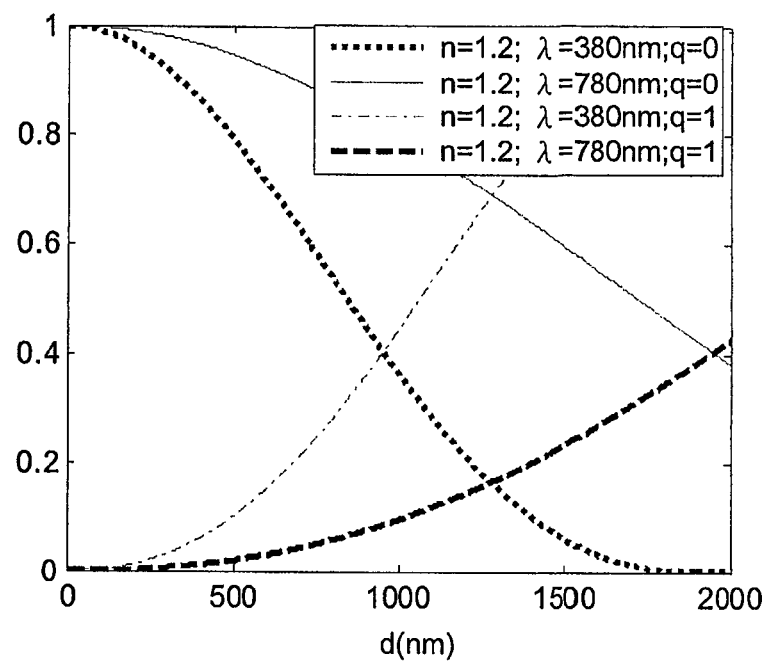
FIG. 10 is a diagram illustrating a relationship between q-th-order diffraction efficiency and a peak to trough thickness difference of a blazed grating.

FIG. 9 is a partial enlarged view of a diffraction grating layer of a liquid crystal panel module according to another embodiment of the invention. Referring to FIG. 9, since a conventional liquid crystal panel module mainly has the gray level inversion problem at the lower viewing angle, the grating of the diffraction grating layer of the present embodiment is a blazed grating, and the light passing through the blazed grating is mainly bended towards a specific direction other than symmetrically bended towards two sides as that does of the phase grating, the blazed grating can be used to bend the light mainly towards the lower viewing angle. In this way, loss of normal energy is relatively less and the gray level inversion problem is resolved. A q-th-order diffraction efficiency of the blazed grating can be represented as:

$$\eta_q = \left\{ \frac{\sin\left[\pi\left(q - \frac{n_2 - n_1}{\lambda}d\right)\right]}{\pi\left(q - \frac{(n_2 - n_1)}{\lambda}d\right)} \right\}^2,$$

as shown in FIG. 10.

Where, λ is the wavelength of the incident light, $n_1$ is a refractive index of environment of the blazed grating (for example, a refractive index of the air is 1), $n_2$ is a refractive index of the blazed grating, and d is a peak to trough thickness difference of the blazed grating. According to FIG. 10, it is known that the wavelength of the incident light is between 380 nm and 780 nm. When the refractive index of the blazed grating is 1.2, the peak to trough thickness difference d of the blazed grating is, for example, less than 1950 nm, and when the refractive index of the blazed grating is 2, the peak to trough thickness difference d of the blazed grating is, for example, less than 390 nm. If a ratio of the 0th-order diffraction efficiency and the 1st-order diffraction efficiency is about 1:0.05, and the refractive index of the blazed grating is between 1.2 and 2, the peak to trough thickness difference d of the blazed grating is then between 70 nm and 713 nm.

Figure 11:
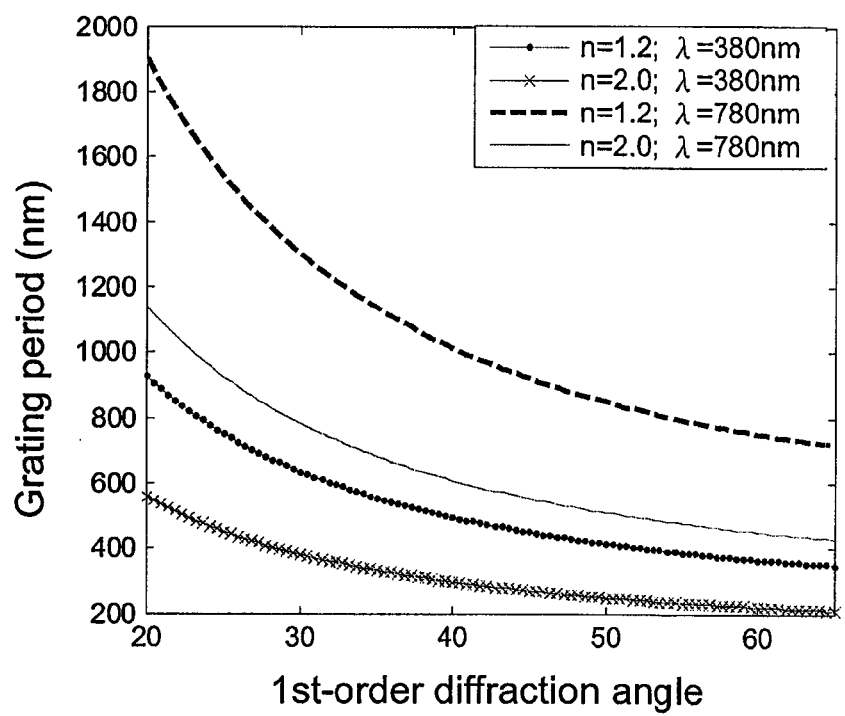
FIG. 11 is a diagram illustrating a relationship between a period and a 1st-order diffraction angle of a blazed grating.

Moreover, a diffraction angle of the blazed grating is set between 20 degrees and 65 degrees. When the light is normally incident to the blazed grating, a period of the blazed grating can be represented as:

$$\Lambda = \frac{q\lambda}{n_2 \sin\theta_q},$$

as that shown in FIG. 11.

Where, λ is the wavelength of the incident light, $n_2$ is the refractive index of the blazed grating, q is a diffraction order (i.e. 1), and $\theta_q$ is a 1st-order diffraction angle of the blazed grating. According to FIG. 11, it is know that when the 1st-order diffraction angle is between 20 degrees and 65 degrees, the period Λ of the blazed grating is approximately between 209 nm and 1900 nm. An bevel angle of the blazed grating of FIG. 9 is $\theta = \tan^{-1}(d/\Lambda)$. Certainly, in the invention, a 2nd-order or a high-order diffraction angle can also be designed between 20 degrees and 65 degrees.

Figure 12:
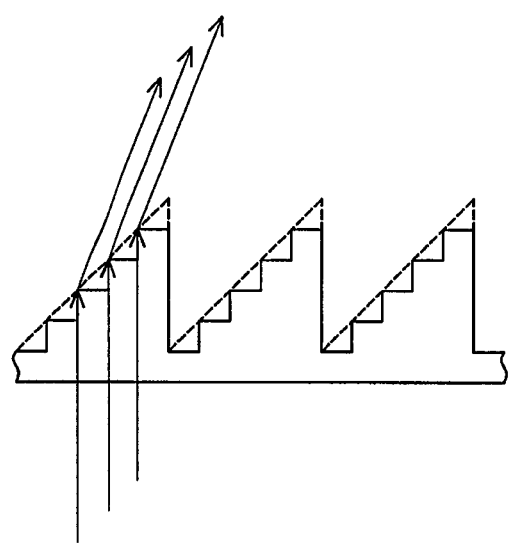
FIG. 12 is a partial enlarged view of a diffraction grating layer according to still another embodiment of the invention.

Moreover, in order to further reduce fabrication cost, the blazed grating can be a binary approximation blazed grating, as that shown in FIG. 12.

Figure 13:
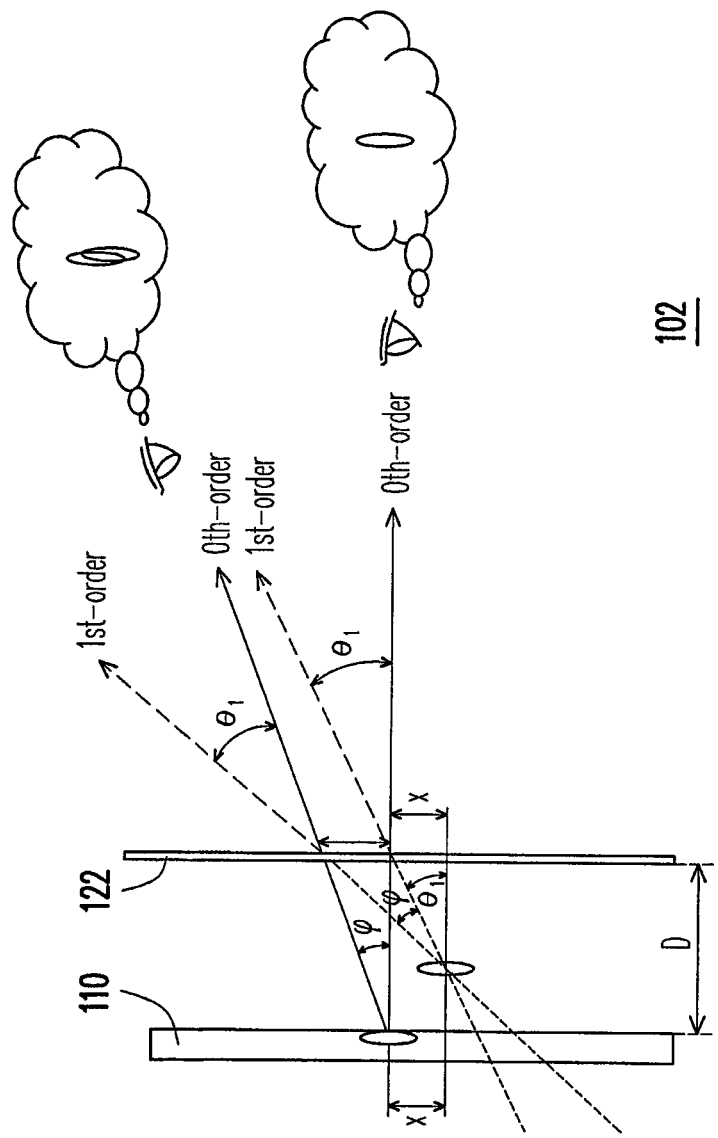
FIG. 13 is a schematic diagram illustrating a liquid crystal panel module according to still another embodiment of the invention.

FIG. 13 is a schematic diagram illustrating a liquid crystal panel module according to still another embodiment of the invention. Referring to FIG. 13, the liquid crystal panel module 102 of the present embodiment is similar to the liquid crystal panel module 100 of FIG. 1, though a distance D is maintained between the diffraction grating layer 122 and the liquid crystal panel 110. When the distance D is maintained between the diffraction grating layer 122 and the liquid crystal panel 110, an obliquely emitted image and a normally emitted image bended by the grating are mutually interfered due to dislocation overlapping. Therefore, a front user can view a clear image, though a side user may view an interfered image overlapped by a plurality of images, so as to achieve a function of preventing others from peeping. Here, only the 0th-order and 1st-order diffractions of the diffraction grating layer 122 is considered, and it is assumed that a divergent angle of the image is ϕ, and the 1st-order diffraction angle of the diffraction grating layer 122 is $\theta_1$. According to FIG. 13, it is known that when the user views from a viewing angle of ϕ, due to the 1st-order diffraction of the diffraction grating layer 122, the light extending towards the front viewing angle and the side viewing angle may form another image in user's eyes, and a distance of the two images is x, and a relationship of the distance D and the viewing angle φ can be represented as:

$$D = \frac{x(\tan(\varphi + \theta_1) + \tan\theta_1)}{\tan\theta_1 \times \tan\varphi},$$

assuming the distance x between a real image and a virtual image is between 0.1 mm and 100 mm, the distance D between the diffraction grating layer 122 and the liquid crystal panel 110 is then between 0.5 mm and 100 mm.

If the 1st-order diffraction angle $\theta_1$ is 30 degrees, and it is expected the distance x between the real image and the virtual image reaches 3 mm when the viewing angle φ is 20 degrees, the distance D is about 25 mm.

On the other hand, if the light first passes through the diffraction grating layer 122 and then enters the liquid crystal panel 110, the diffraction grating layer 122 can be designed to bend the obliquely incident light into normally incident light for entering the liquid crystal panel 110, so as to improve light utilization efficiency.

Figure 14:
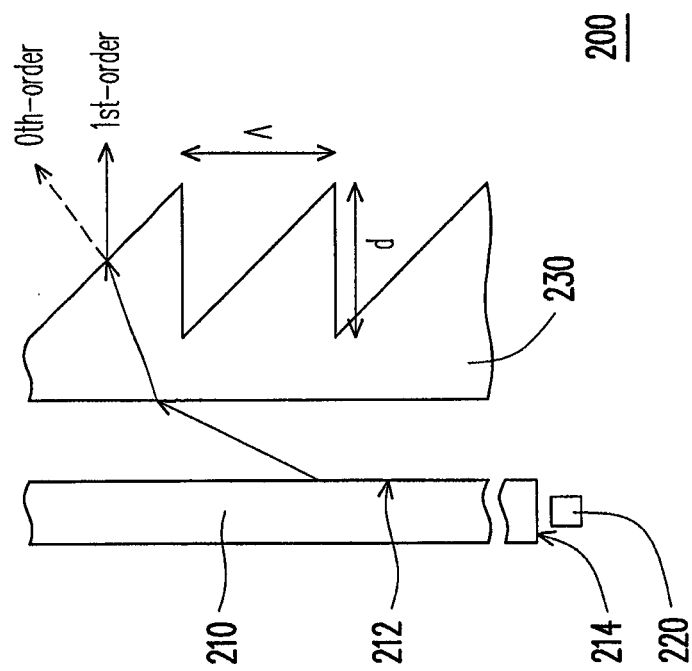
FIG. 14 is a schematic diagram illustrating a backlight module according to an embodiment of the invention.

FIG. 14 is a schematic diagram illustrating a backlight module according to an embodiment of the invention. Referring to FIG. 14, the backlight module 200 of the present embodiment includes a light guide plate 210, a light emitting element 220 and a diffraction grating film 230. A grating of the diffraction grating film 230 can be a blazed grating or a phase grating, etc. The light guide plate 210 has a light emitting surface 212 and at least a light incident surface 214 adjacent to the light emitting surface 212. The light emitting element 220 is disposed next to the light incident surface 214, and the light emitting element 220 can be a cold cathode fluorescent lamp (CCFL), a light emitting diode or other light emitting devices. The diffraction grating film 230 is disposed on the light emitting surface 212. Since the light provided by the light emitting element 220 enters the light guide plate 210 through the light incident surface 214 located at a side of the light guide plate 210, when the light emits out from the light emitting surface 212, a most part of the light is not normally emitted out, but is emitted out towards a direction apart from the light emitting element 220 as that shown in FIG. 14. However, the light passing through the diffraction grating film 230 is bended towards the light emitting element 220, i.e. the light is bended to emit out along a direction normal to the light emitting surface 212 as far as possible. Alternatively, the diffraction grating film 230 can be disposed on a surface of the light guide plate 210 opposite to the light emitting surface 212, so that after the light emits from the light emitting element 220, the light enters the reflective diffraction grating film 230, and is reflected to enter the liquid crystal panel 110 along a relatively collimated direction. In this way, brightness of the normal light provided by the backlight module 200 can be increased, so that a usage amount of expensive brightness enhancement films can be reduced to reduce cost of the backlight module 200. Meanwhile, compared to a conventional prism brightness enhancement film, the diffraction grating film 230 further has an advantage of small light packet, i.e. brightness distribution is more even. In order to reduce the fabrication cost, the grating of the diffraction grating film 230 can be a binary approximation blazed grating.

A period Λ of the grating of the diffraction grating film 230 is between 380 nm and 2281 nm, and a peak to trough thickness difference d of the grating of the diffraction grating film 230 is, for example, 280 nm and 4910 nm.

Figure 15:
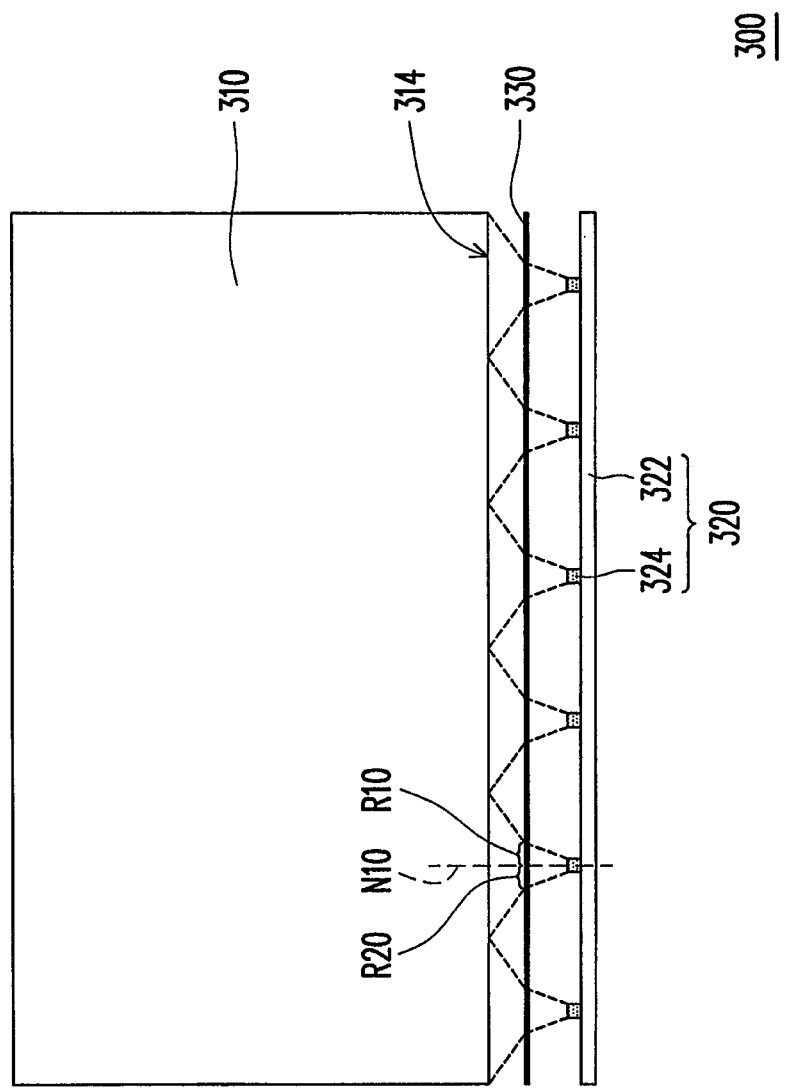
FIG. 15 is a schematic diagram illustrating a backlight module according to another embodiment of the invention.

FIG. 15 is a schematic diagram illustrating a backlight module according to another embodiment of the invention. Referring to FIG. 15, the backlight module 300 of the present embodiment includes a light guide plate 310, a light emitting element 320 and a diffraction grating film 330. A grating of the diffraction grating film 330 can be a blazed grating, a binary approximation blazed grating or a phase grating, etc. The light guide plate 310 has at least a light incident surface 314. The light emitting element 320 is disposed next to the light incident surface 314, and the diffraction grating film 330 is disposed between the light emitting element 320 and the light incident surface 314. Due to a function of the diffraction grating film 330, the light provided by the light emitting element 320 can enter the light guide plate 310 with a relatively large divergent angle, so as to mitigate a problem of uneven brightness of the light source around the light incident surface 314 due to excessively small divergent angle.

The light emitting element 320 of the present embodiment includes a circuit board 322 and a plurality of light emitting diodes 324 arranged on the circuit board 322. Light emitted from each of the light emitting diodes 324 is bended towards a direction apart from each of the light emitting diodes 322 after passing through the diffraction grating film 330. In detail, taking a main optical axis N10 of each of the light emitting diodes 324 as a reference, the grating of the diffraction grating film 330 in a region R10 located to the right of the main optical axis N10 bends the light provided by the light emitting diode 324 rightwards, and the grating of the diffraction grating film 330 in a region R20 located to the left of the main optical axis N10 bends the light provided by the light emitting diode 324 leftwards. In other words, the gratings of the diffraction grating film 330 in two regions R10 and R20 located at both sides of the main optical axis N10 are symmetric along the main optical axis N10. Moreover, it is unnecessary to configure the grating on the diffraction grating film 330 at a place where the light provided by the light emitting diodes 324 does not pass there through, so as to further save the cost.

Figure 16:
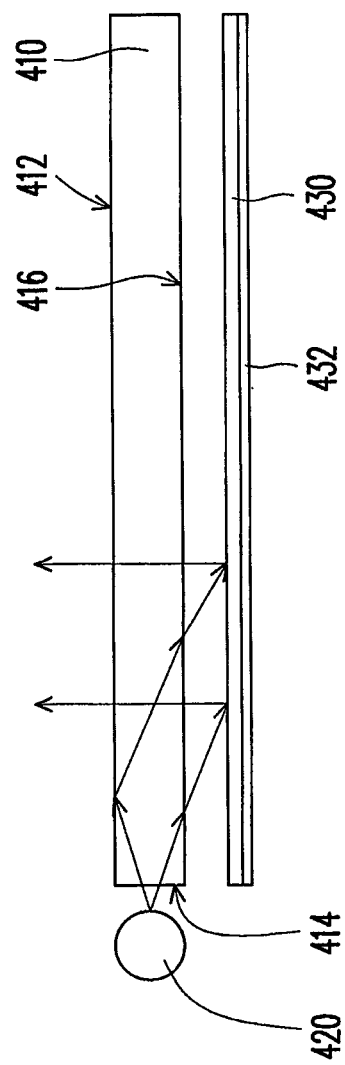
FIG. 16 is a schematic diagram illustrating a backlight module according to still another embodiment of the present invention.

FIG. 16 is a schematic diagram illustrating a backlight module according to still another embodiment of the present invention. Referring to FIG. 16, the backlight module 400 of the present embodiment is similar to the backlight module 300 of FIG. 15, and a difference there between is that the backlight module 400 of the present embodiment applies a reflective diffraction grating film 430, and a light emitting element 420 is, for example, a CCFL, though the invention is not limited thereto. A light guide plate 410 has at least a light incident surface 414, a light emitting surface 412 and a bottom surface 416, where the light emitting surface 412 is opposite to the bottom surface 416. The light emitting element 420 is disposed next to the light incident surface 414. The reflective diffraction grating film 430 is disposed next to the bottom surface 416. The reflective diffraction grating film 430 can be closely attached to the bottom surface 416 or a distance can be maintained between the reflective diffraction grating film 430 and the bottom surface 416. In the light provided by the light emitting element 420, at least a part of the light sequentially passes through the light incident surface 414 and the bottom surface 416, and is reflected by the reflective diffraction grating film 430 to again pass through the bottom surface 116 to emit from the light emitting surface 412. The reflective diffraction grating film 430 can be used to replace a reflection plate of a conventional backlight module, and can also be used to replace lattice points or other micro structures on bottom of a conventional light guide plate that are used for diffusing the light. Therefore, usage of the reflective diffraction grating film 430 avails reducing the whole cost of the backlight module 400. Moreover, a reflective material layer 432 can be disposed on a surface the reflective diffraction grating film 430 back to the light guide plate 410 to further increase reflectivity.

Figure 17:
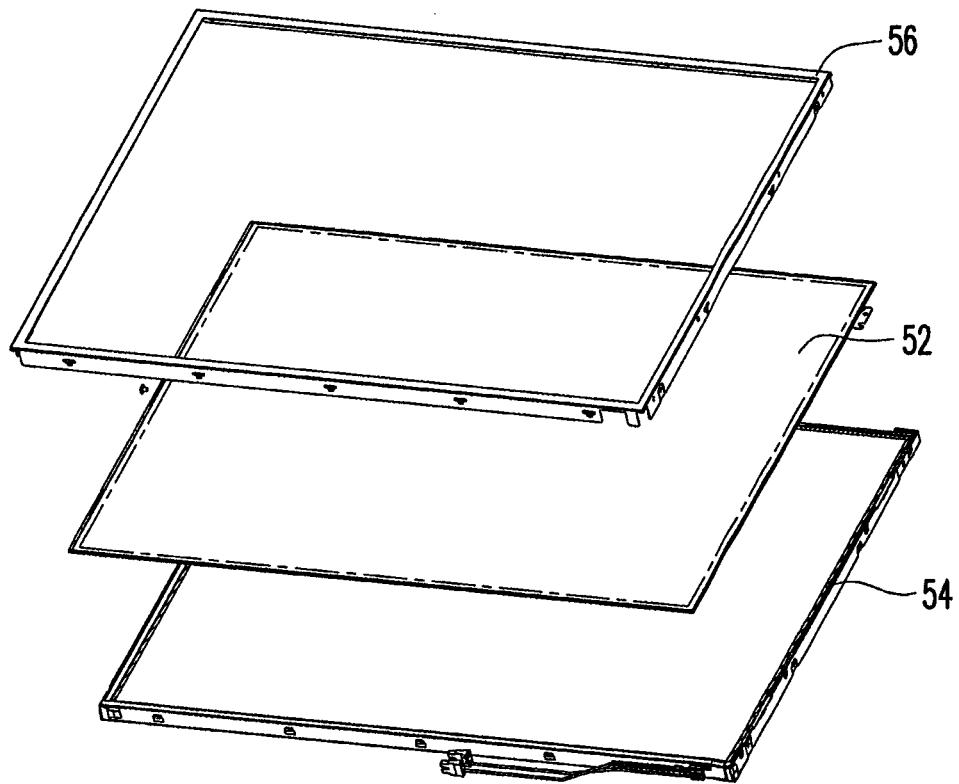
FIG. 17 is an exploded view of a liquid crystal display (LCD) according to an embodiment of the invention.

FIG. 17 is an exploded view of a liquid crystal display (LCD) according to an embodiment of the invention. Referring to FIG. 17, the LCD 50 of the present embodiment includes a liquid crystal panel module 52 and a backlight module 54. The liquid crystal panel module 52 is disposed on the backlight module 54. If the liquid crystal panel module 52 is implemented by the liquid crystal panel module of the embodiment of FIG. 1 or FIG. 9, and the diffraction grating layer is located at a side of the liquid crystal panel module 52 apart from the backlight module 54, the problems of color shift, gray level inversion and low brightness of the LCD 50 in a large viewing angle can be mitigated. If the liquid crystal panel module 52 is implemented by the liquid crystal panel module of the embodiment of FIG. 1 or FIG. 9, and the diffraction grating layer is located at a side of the liquid crystal panel module 52 close to the backlight module 54, the image displayed by the LCD 50 may have a high brightness and contrast. If the liquid crystal panel module 52 is implemented by the liquid crystal panel module of the embodiment of FIG. 13, and the diffraction grating layer is located at a side of the liquid crystal panel module 52 apart from the backlight module 54, the LCD 50 has the function of preventing others from peeping. If the backlight module 54 is implemented by the backlight module of the embodiment of FIG. 14, the image displayed by the LCD 50 may have a high brightness and contrast. Certainly, if the liquid crystal panel module 52 is implemented by the liquid crystal panel modules of the aforementioned embodiments, the backlight module 54 can also be implemented by the backlight modules of the aforementioned embodiments. Moreover, the LCD 50 may further have a front frame 56 for stably fixing the liquid crystal panel module 52 on the backlight module 54.

In summary, in the liquid crystal panel module of the invention, the diffraction grating layer is used to produce multi-order diffraction light to resolve the problems of color shift and gray level inversion under a large viewing angle, and the diffraction grating layer is used to collimate a large-angle incident light provided by the backlight module, so as to improve the light utilization efficiency. Moreover, the backlight module of the invention can also use the diffraction grating film to pull straight the obliquely emitted light to improve light utilization efficiency. The LCD of the invention can simultaneously or individually use the aforementioned liquid crystal panel modules and the backlight modules, which not only have the aforementioned advantages but also have advantages of low cost and environmental protection.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A backlight module, comprising:
a light guide plate, having at least a light incident surface, a light emitting surface and a bottom surface, wherein the light emitting surface is opposite to the bottom surface;
a light emitting element, disposed next to the light incident surface;
a reflective diffraction grating film, disposed next to the bottom surface, wherein the reflective diffraction grating is configured to reflect a part of light provided by the light emitting element which passes through the light incident surface and the bottom surface back through the bottom surface to emit from the light emitting surface; and
a reflective material layer, disposed on a surface of the reflective diffraction grating film facing away from the light guide plate.

2. The backlight module as claimed in claim 1, wherein a grating of the reflective diffraction grating film is a binary approximation blazed grating.

3. The backlight module as claimed in claim 1, wherein a grating of the reflective diffraction grating film is a blazed grating.

4. A liquid crystal display, comprising: a backlight module as claimed in claim 1; and a liquid crystal panel module, disposed on the backlight module.

* * * * *